Feb. 11, 1958 H. LINDARS 2,823,005
AUTOMATIC WEIGHING APPARATUS
Filed March 27, 1951 3 Sheets-Sheet 2
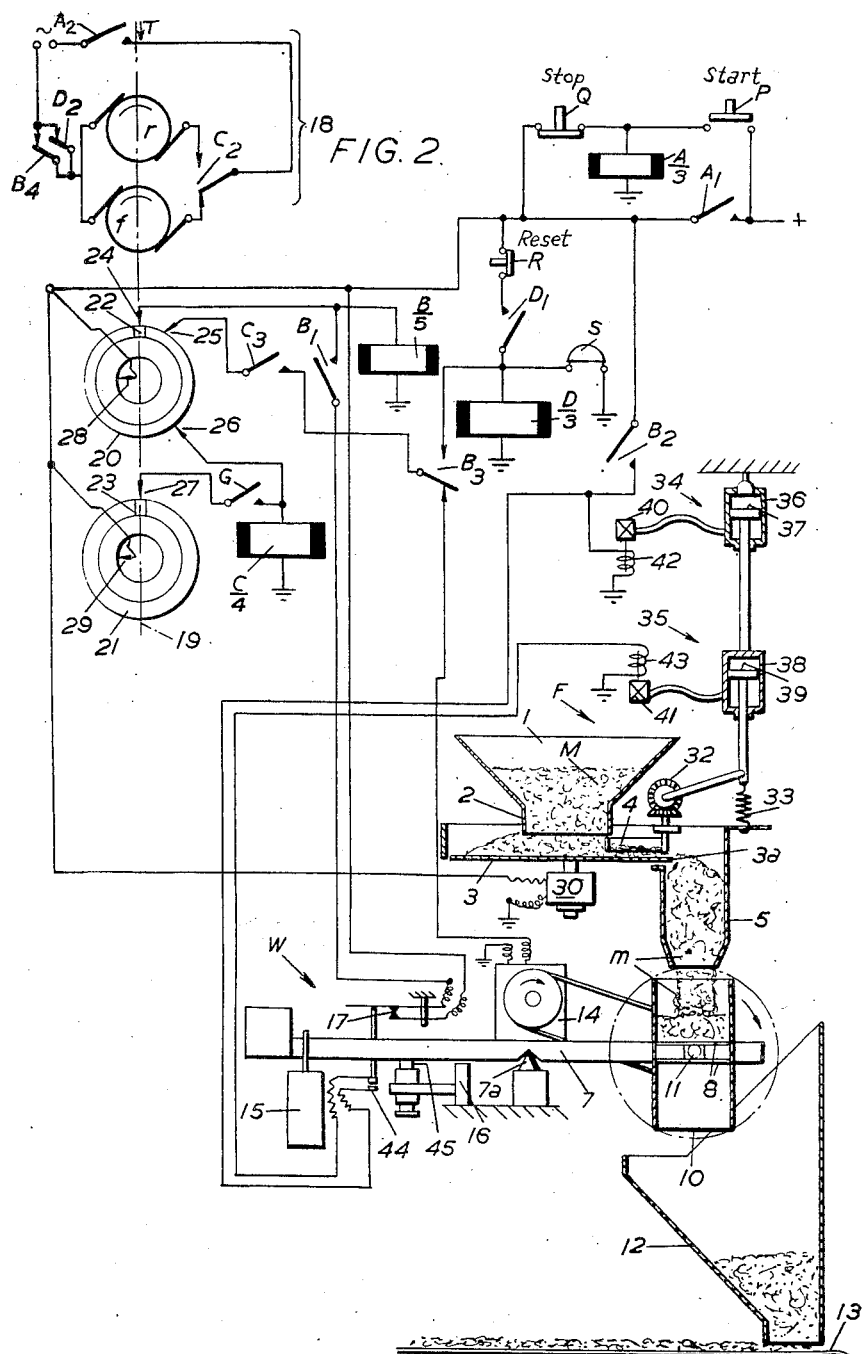
FIG. 2.
Inventor
Herman Lindars
By 
Attorneys Feb. 11, 1958 H. LINDARS 2,823,005
AUTOMATIC WEIGHING APPARATUS
Filed March 27, 1951 3 Sheets-Sheet 3
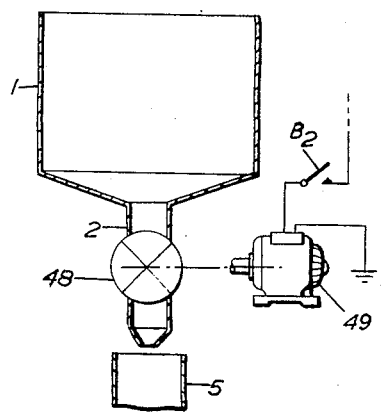
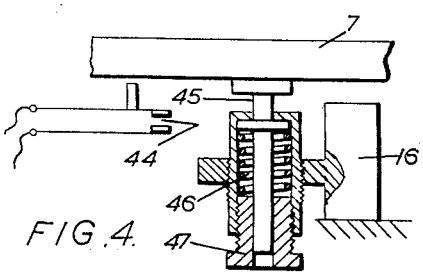
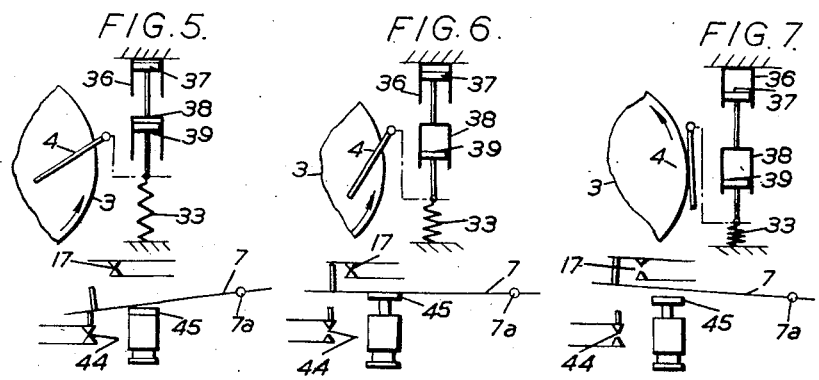
Inventor
Herman Lindars
By Pech & Peck
Attorneys United States Patent Office 2,823,005
Patented Feb. 11, 1958

2,823,005

AUTOMATIC WEIGHING APPARATUS

Herman Lindars, Sheffield, England

Application March 27, 1951, Serial No. 217,769

Claims priority, application Great Britain March 28, 1950

4 Claims. (Cl. 249—20)

This invention relates to automatic feed apparatus and has for an object to provide apparatus for the feed of liquid or semi-liquid materials, or solid materials in lump granular or pulverulent form, which can be accurately controlled—if desired from a remote point—to maintain a given mean rate of delivery.

Where materials are required to be delivered at a constant rate, it is frequently sufficient to ensure that the mean rate of delivery is maintained at the required value by the discharge at frequent short intervals of time of relatively small, discrete, and accurately determined equal quantities of the material. For example, if it is required to deliver to an apparatus one ton of a given material per hour, satisfactory operation may be achieved if equal amounts of 37⅓ lbs. of the material are discharged at intervals of one minute. Should a further smoothing of the delivery be required, the discharge of these batches of material may be spread by, say, a guillotine device on a conveyor or equivalent mechanism as will be understood by those versed in the art.

If, in such an arrangement, it is desired to change the rate of flow per hour to, say, two tons, the same batch weight of material (i. e. 37⅓ lbs.) may be discharged at intervals of 30 seconds, whilst if the mean rate of delivery is required to be reduced to 10 cwt. per hour, the same batches may be discharged at intervals of two minutes. The mean rate of flow can therefore be rendered infinitely variable by the provision of means for controlling the time intervals in stepless manner between the limits of 30 seconds and two minutes.

According to the present invention, feed mechanism for liquid, semi-liquid or pulverulent material comprises weighing mechanism which is pre-set to weigh a predetermined quantity of the material, means for feeding the said material to the weighing mechanism, means for interrupting the said feeding when the predetermined weight has been so delivered, means for discharging the said predetermined quantity of material, and timing mechanism for selecting the rate of repetition of the cycle of weighing and discharging operations in accordance with the desired mean rate of feed of the material.

In order that the invention may be more clearly understood, practical embodiments thereof will be described by way of example only, with reference to the accompanying drawings in which:

Fig. 2 illustrates a modification of the arrangement shown in Fig. 1;

Fig. 3 shows an alternative means of controlling the flow of material to the weighbeam;

Fig. 4 is a fragmentary view, to a larger scale, of a detail of Fig. 2; and

Figure 1:
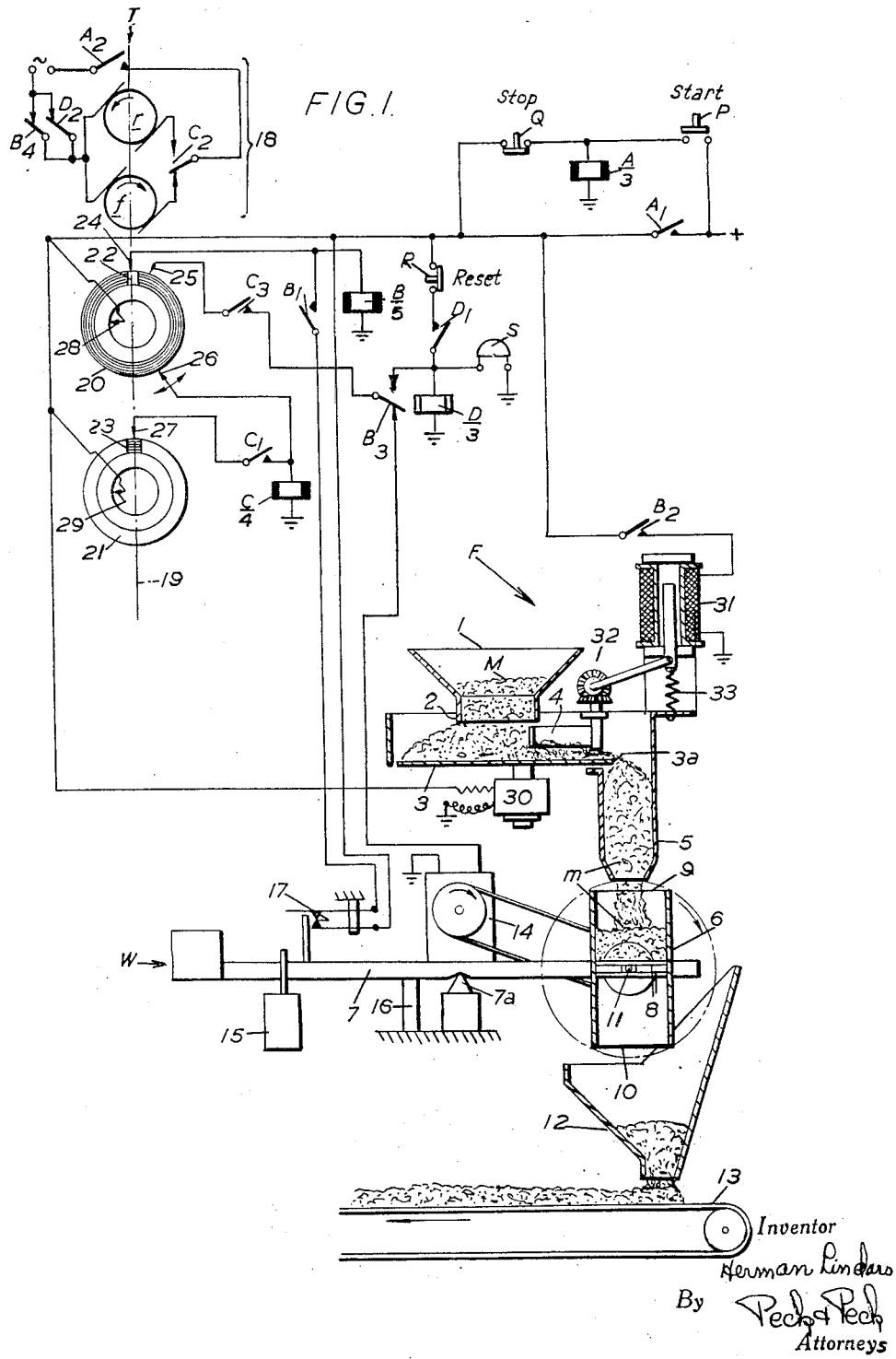
Fig. 1 shows a schematic arrangement of an automatic weighing and discharge apparatus.

Figs. 5, 6, and 7 show, in diagrammatic form, the three successive positions of the weighbeam in the modification of Fig. 2 and the corresponding positions of the strickle 4 and its operating mechanism.

Throughout the drawings, like parts carry similar reference numerals.

Referring first to Fig. 1, the apparatus comprises essentially an automatic weighing mechanism indicated generally at W, which is adapted to effect repetitive accurate weighings of the material to be discharged, a remote-controlled feed device F for feeding the material at regular intervals to the weighing mechanism W, and a timing unit T for controlling the sequence or duration of the several operations.

The feeding apparatus includes a bin or reservoir 1 or like container for a large quantity of the material M to be fed which has its outlet 2 located above a horizontal rotatable table 3 with which co-operates an adjustable strickle or straight edge 5. The table edge 3a overlaps the feed chute 5 adjacent the strickle 4. The lower end of the chute is positioned above a double-ended tipping hopper 6 which is carried on one end of a weighbeam 7. The tipping hopper 6 has a central partition 8 and oppositely-directed mouths 9, 10 and is pivotally mounted on the weighbeam 7 on a horizontal axis 11 so that, when one mouth—say, 9—of the hopper 6 is presented to the outlet from the chute 5 to receive material fed therethrough from the table 3 by the action of the strickle 4, the other outlet 10 is located above a suitable receptacle 12 which may be the apparatus to which the material M is to be discharged or, as shown, may be part of a conveyor mechanism 13 or other similar delivery device for carrying the material M to its final delivery point. The tipping or discharge hopper 6 is controlled by an electric motor 14 which is arranged to be energised, on receipt of a pulse through a circuit controlled by the timing unit T and to be more fully described below, and to rotate the hopper about its horizontal axis 11 through 180° so that the batch $m$ of the material M in one-half thereof is discharged whilst the mouth—say 10—of the other half is presented to the feed chute 5. The motor 14 is automatically cut out after each inversion of the hopper 6 and its control circuit is reset for energisation by a subsequent pulse from the timing circuit.

The weighbeam 7 carries one or more balance weights (represented schematically by the single weight 15) which can be set—if desired, by remote control as described, for example, in application Serial No. 226,185, dated May 14, 1951, now Patent 2,688,477—in accordance with the weight of each batch $m$ of material to be discharged to the delivery means. When the tipping hopper 6 is empty, the weighbeam 7 is supported on a fixed rest 16 in a substantially horizontal position. In this position, a pair of slave contacts 17, which are operable by the weighbeam 7, are closed. When the required weight of material $m$ has been fed to the hopper 6, the weighbeam 7 tilts to open these contacts, and, through the timing circuit referred to above, inversion of the hopper 6 is effected to discharge the weighed material $m$.

The timing of the sequence of operations of the weighing mechanism is controlled by a timing unit T which may be constructed as described in British Patent No. 566,911 or in application Serial No. 211,832, dated February 20, 1951. Where the latter construction is adopted, the timing unit T consists of a synchronous motor 18 having forward and reverse rotors $f$, $r$ respectively and geared to a shaft 19 on which are mounted two discs 20, 21, the disc 20 having a non-conducting periphery which is interrupted at one point by a short conducting segment 22, whilst the other has a conducting periphery which is interrupted at one point by a short insulating segment 23. The forward rotor $f$ rotates in one direction and the reverse rotor rotates in the opposite direction. Hence the discs 20, 21 are rotated together in either one direction or the other, this being, preferably, a slow rotation.

Three brushes 24, 25, 26 engage the first or substantially non-conducting disc 20. Of these, the brush 24 is fixed in what is defined as the zero position of the timing unit, whilst a second brush 25 is located closely adjacent thereto in the forward direction of rotation of the disc. The third brush 26 is angularly adjustable according to the time intervals to be measured by the timing unit. A single fixed brush 27 engages the periphery of the second disc 21 at the zero position. The conducting portions of both discs are electrically connected together through brushes 28, 29 and to the winding of an electric motor 30 which rotates the horizontal table 3. The circuit is energised from the main supply through a pair of normally open relay contacts $A_1$.

The electrical circuit controlling the apparatus is provided with "start," "stop" and "re-set" buttons or switches P, Q, R respectively and an alarm S which is arranged to be energised should the required incremental weight of material not be delivered to the tipping hopper 6 during the interval of time allowed between successive discharges. The start button P is connected between the mains supply and the winding of a first relay A/3 whose hold-on contacts $A_1$ serve to energise the discs 20, 21 carried on the shaft 19 of the timing unit T, and also the electric motor 30 driving the rotatable table 3. This relay A/3 remains energised throughout the operation of the apparatus until the stop button or switch Q is opened.

As soon as the first relay A/3 is energised it closes contacts $A_2$ in the circuit to the forward rotor $f$ of the synchronous motor 18 through a normally closed pair of a set of changeover contacts $C_2$ controlled by a third relay C/4 and two pairs of parallel-connected normally closed contacts $B_4$, $D_2$, the contacts $B_4$ being operated by a second relay B/5 and the contacts $D_2$ by a fourth relay D/3. These contacts are in the common return circuit to both the forward and reverse rotors $f$, $r$, of the synchronous motor 18. Simultaneously, the second relay B/5 is energised through the conducting segment 22 on the first disc 20 and the coacting zero brush 24 so that the contacts $B_4$ in the circuit of the synchronous motor 18 are opened. A normally open pair of contacts $B_1$ controlled by the second relay are closed to complete a hold-on circuit through the slave contacts 17 on the weighbeam 7.

The second relay also controls a pair of normally open contacts $B_2$ which are connected between the mains supply and the energising winding of a solenoid 31 which controls the strickle 4 through gearing 32. As soon, therefore, as the start button P is pressed, the strickle 4 is moved to the operative position in which material from the rotatable table 3 is deflected into the chute 5. Material $m$ thus immediately commences to flow into the one half of the tipping hopper 6.

The synchronous motor 18 commences to run in the forward direction and almost immediately the conducting segment 22 on the first disc 20 moves away from the zero brush 24, and the second relay B/5 is held in through the slave contacts 17 on the weighbeam 7. As the conducting segment 22 on the first disc 20 passes beneath the second fixed brush 25, no circuit is completed, since the said brush is connected in series with a pair of normally open contacts $C_3$ controlled by the third relay C/4 which is only energised when the segment 22 reaches the adjustable third brush 26.

As soon as the desired weight of material $m$ has been weighed, the weighbeam 7 moves and opens the slave contacts 17, thus breaking the hold-on circuit of the second relay B/5. The strickle operating solenoid 31 is thereupon de-energised and a return spring 33 returns the strickle 4 to its inoperative position. No further material is fed to the chute 5. Simultaneously, a pair of change-over contacts $B_3$ controlled by the second relay B/5 are allowed to resume their normal position (as shown) in which they connect the motor 14 driving the tipping hopper 6 in series with the second fixed brush 25 on the first disc 20 and the normally open contacts $C_3$ controlled by the third relay C/4. The timing circuit to the hopper driving motor 14 is thus set in readiness for energisation on the next occasion when the conducting segment 22 of the first disc 21 passes beneath the second brush 25.

The synchronous motor 18 of the timing unit T continues to run in the forward direction until the conducting segment 22 on the first disc 20 reaches the adjustable third brush 26. When this occurs, the third relay C/4 is energised and closes a pair of hold-on contacts $C_1$ which are connected in series with the brush 27 co-operating with the second disc 21. The third relay C/4 thus remains energised so long as the conducting portion of the periphery of the second disc 21 is in contact with the brush 27. On energisation, the third relay C/4 changes over the reversing contacts $C_2$ in the circuit of the synchronous motor 18 so that the forward rotor $f$ is de-energised and the reverse rotor $r$ energised. The motor 18 thereupon reverses and continues to run in the other direction.

As soon as the conducting segment 22 on the first disc 20 passes for the second time beneath the second fixed brush 25, a pulse is fed from the mains through this brush, the normally open contacts $C_3$, and the change-over contacts $B_3$, to the control circuit of the motor 14 driving the tipping hopper 6. This motor is thereby energised to rotate the hopper through 180°, and a weighed batch $m$ of material is discharged on to the conveyor 13.

While this discharge operation is taking place, the conducting segment 22 on the first disc 20 moves from the second fixed brush 25 to the zero brush 24. Simultaneously, with its return to the zero position, the insulating segment 23 on the second disc 21 also moves beneath the coacting brush 27 and the hold-on circuit for the third relay C/4 is opened. The relay thus drops out and its change-over contacts $C_2$ re-energise the forward rotor $f$ of the synchronous motor 18, thus effecting a further reversal of the direction of rotation of the motor 18. At the same time, the second relay B/5 is again energised through the zero brush 24 on the first disc 20, and the cycle of operations is repeated. Unless any modification of the position of the third or adjustable brush 26 has been made in the meantime, the pre-determined weight $m$ of material will continue to be discharged at regular time intervals and fed to the conveyor 13.

Should the required weight $m$ of material not be fed into the tipping hopper 6 within the time elapsing between the commencement of forward rotation of the synchronous motor 18 and the instant when the conducting segment 22 on the first disc 20 passes beneath the second fixed brush 25 on the next reverse rotation of the motor, the second relay B/5 remains energised by the hold-on circuit through the slave contacts 17 on the weighbeam 7 so that the changeover contacts $B_3$ controlled by this relay are held in the position in which the circuit to the hopper inverting motor 14 is open, while the circuit from the second fixed brush 25 to the fourth relay D/3 is closed through the contacts $C_4$. The relay C/3 is still energized by the hold-on circuit through the second disc 21, so that when the conducting segment 22 on the first disc 20 passes beneath the second fixed brush 25, the circuit from the fourth relay D/3 to the mains is completed.

The fourth relay D/3 closes a pair of hold-on contacts $D_1$ connected to the main supply through the normally closed re-set button or switch R. Since the alarm S is connected in parallel with the fourth relay D/3, it is energised therewith so that an indication is given that the required weight $m$ of material has not been fed. This circuit remains energised until the re-set button or switch R is opened to release the fourth relay D/3.

The fourth relay D/3 also controls the contacts $D_2$ in the circuit of the synchronous motor 18, and hence, when the conducting segment 22 on the first disc 20 reaches the zero brush 24 and the second relay B/5 is energised to open the contacts $B_4$, the circuit to both rotors $f$, $r$ of the synchronous motor 18 is opened and the motor remains stopped so long as the fourth relay D/3 remains energised. No further feed of material M can therefore take place until the cause of the failure to feed the required weight $m$ of material into the hopper 6 has been ascertained or removed and the re-set button or switch R operated.

The time required for the feed into the tipping hopper 6 of the predetermined weight $m$ of the material in each batch fed to the receptacle 12 determines the lower limit position of the adjustable third brush 26 on the first disc 20, and hence the maximum mean rate of delivery of the material M to the final delivery point. Since the position of the said third brush is infinitely variable, it will therefore be seen that the said mean rate of feed can also be rendered infinitely variable within the limits of the apparatus. Furthermore, the timing unit T can be remotely located if desired without detriment to the accuracy of the control effected by it.

Where the balance weight or weights 15 on the weighbeam 7 is or are adjustable to vary the predetermined quantity of material in each batch $m$, adjustment of the position of such balance weigh or weights can effect the variations in the mean rate of delivery of the material M to the final delivery point, as will be understood. Such adjustment may, if desired, be remotely controlled, as indicated above.

It will be understood that various alternative methods of feeding material to the tipping hopper 6 may be adopted as desired in place of the rotatable table 3 and adjustable strickle 4. Thus, for example, as shown in Fig. 3, these components may be replaced by a valve 48 in the outlet 2 from the main container 1, the solenoid 31 of Fig. 1 being replaced by a rotary motor 49 if desired. Such an arrangement would be more suitable where the material M to be fed is of liquid or semi-liquid form. Any other arrangement of timing apparatus may also be adopted as desired to ensure that the required sequence of operations of time intervals is effected.

In the alternative embodiment of the invention shown in Fig. 2, the mechanism for controlling the strickle 4 comprises a pair of single-acting piston and cylinder servomotors, indicated generally by the references 34, 35, which are connected mechanically in series or tandem, i. e. the cylinder 36 of one motor 34 is fixed and its piston 37 is connected to the cylinder 38 of the other motor 35, the piston 39 of the latter being connected to the strickle 4 through suitable gearing 32 according to requirements. A bias spring 33 is connected to the strickle to return it to its inoperative position.

Each motor 34, 35 is controlled by a respective valve 40, 41 operated by a solenoid 42, 43 or other electric motor and connected to a fluid pressure line which may be an air or hydraulic pressureline), the solenoid for each valve being connected to a source of D. C. supply through appropriate contacts. The solenoid 42 is energised through the normally open contacts $B_2$. The solenoid 43 is energised through a pair of auxiliary contacts 44 connected in series with the said contacts $B_2$, the auxiliary contacts 44 being held closed by the weigh beam 7 during the initial period of charging of the hopper 6.

The arrangement is thus such that when the second relay B/5 is energised to close the contacts $B_2$ both the solenoids 42, 43 are energised to open the valves 40, 41 and thus to move the pistons 37, 39 to the inner limits of their travel in their respective servo cylinders 36, 38. This causes the strickle 4 to be moved to its fully operative position whereby material M is deflected from the rotary table 3 at the maximum rate for feeding into the hopper 6 (see also Fig. 4).

A spring-loaded plunger 45 is located beneath the weighbeam 7 on the side of its fulcrum 7a remote from the hopper 6 and is arranged to engage the underside of the weighbeam 7 when the hopper 6 is empty. The travel of the plunger 45 in the upward direction is limited so that the pressure of its loading spring 46 does not act on the weighbeam after the latter has reached a substantially horizontal position. The strength of the spring 46 is adjusted by the threaded plug 47 so that the bias moment applied to the weighbeam 7 is equal to the difference between the moment of the predetermined full weight of material $m$ in the hopper 6 and a pre-selected limiting weight at which it is desired that the rate of feed to the hopper 6 should be reduced. Thus, when the hopper 6 is empty, the plunger 45 is fully depressed and the auxiliary contacts 44 controlling the solenoid 43 are closed (see diagram, Fig. 5).

As has already been described, in these circumstances both valve-operating solenoids 42, 43 are energised to cause the strickle 4 to move it to its fully operative position. As the weight in the hopper 6 increases, the combined action of its moment and that of the plunger 45 about the fulcrum 7a of the weighbeam 7 approaches a value equal to the moment of the total predetermined weight $m$ to be fed into the hopper 6. When this preliminary balance is reached, the weighbeam 7 moves to an intermediate position in which it is held under the combined action of the partially filled hopper 6 and the spring-loaded plunger 45, the motion of the weighbeam to this position being sufficient to open the auxiliary contacts 44 which thereby de-energise the solenoid 43 of the second valve 41 (see diagram, Fig. 6). The intermediate position of the weighbeam is determined by the limit of upward travel of the plunger 45, and is just short of that in which it opens the slave contacts 17 which determine the instant of cessation of the supply of material to the hopper 6 and the discharge of the latter.

When the second solenoid operated valve 41 is closed by the opening of the auxiliary contacts 44, the piston 39 in the second servo cylinder 38 moves outwards under the action of the strickle return spring 33, thus moving the strickle 4 towards its inoperative position. Since, however, the first solenoid-operated valve 40 remains open and the piston 37 in the first servo cylinder 36 is held under pressure at the inner end of its stroke, the second servo cylinder 38 is held in an axially displaced position so that, when its piston 39 reaches the outer end of its travel, the strickle 4 has only reached an intermediate position in its travel toward its fully inoperative position (see diagram, Fig. 6). In this intermediate position, therefore, the rate of deflection of material M from the rotary table 3 is reduced, and consequently the rate of filling of the hopper 6 is slowed down. At the same time, the quantity of material "in suspension" in the chute 5 is less.

When the hopper 6 is finally filled with the predetermined full quantity of material, the weighbeam 7 completes its travel to open its slave contacts 17 and so to cause de-energisation of the first valve operating solenoid 42 (see diagram, Fig. 7). This valve cuts off the pressure supply to the first servo cylinder 36 and allows its piston 37 to move outwards to its outer limit of travel under the action of the strickle return spring 33. The strickle 4 is thus moved to its fully inoperative position due to the corresponding travel of the second cylinder 38 with its piston 39, and the supply of material M to the hopper 6 is finally interrupted.

What I claim is:

1. Material feed mechanism having a weighing device; a material hopper mounted thereon; means for discharging said hopper; variable timing mechanism for controlling the intervals between successive hopper discharges; a conveyor located so as to receive discharged material and convey it to a delivery point; hopper charging apparatus comprising a horizontal rotary table spaced above the hopper; means for maintaining a supply of material on the table; a strickle movable over the surface of the table for dispensing some of the material therefrom; and means for moving the strickle from an inoperative to an operative position and vice versa.

2. In combination: a weighbeam; means for predetermining the load to be weighed at each automatic weighing operation; a material hopper on the weighbeam; a material reservoir; a rotatable table located beneath said reservoir; a strickle movable over the surface of the table for displacing some of the material therefrom; electrically operated mechanism for moving said strickle from an inoperative to an operative position, and vice versa; contacts operated by the weighbeam for controlling the strickle moving mechanism; a material chute for feeding material diverted from the table to the material hopper of the weighbeam; a motor for discharging the hopper after each weighing; a variable period timer; contacts in the motor circuit operated by the timer; a conveyor, and means for guiding discharged material onto the conveyor.

3. The combination according to claim 2 wherein the strickle operating mechanism comprises a fluid pressure operated motor mechanically coupled to the strickle and electrically operated valve means for controlling the supply of pressure fluid to the said motor.

4. The combination according to claim 3 including a plurality of piston and cylinder type fluid pressure operated motors mechanically coupled in tandem, each motor being controlled by a separate electrically operated valve.

References Cited in the file of this patent

UNITED STATES PATENTS

| Number | Name | Date |
|---|---|---|
| 1,115,633 | Wellman | Nov. 3, 1914 |
| 1,179,858 | Menier | Apr. 18, 1916 |
| 1,203,285 | Webber | Oct. 31, 1916 |
| 1,364,003 | Smith | Dec. 28, 1920 |
| 1,971,807 | Bates | Aug. 28, 1934 |
| 2,058,775 | Cundall | Oct. 27, 1936 |
| 2,073,652 | Robb | Mar. 16, 1937 |
| 2,100,874 | Ryan | Nov. 30, 1937 |
| 2,198,788 | Popov | Apr. 30, 1940 |
| 2,208,284 | Weckerly | July 16, 1940 |
| 2,232,404 | Pratt | Feb. 18, 1941 |
| 2,299,636 | Mansbendel | Oct. 20, 1942 |
| 2,470,427 | Brodie | May 17, 1949 |
| 2,491,056 | Muskat | Dec. 13, 1949 |
| 2,503,295 | Palmer | Apr. 11, 1950 |
| 2,544,155 | Harkenrider | Mar. 6, 1951 |
| 2,597,120 | McCargar | May 20, 1952 |
| 2,603,442 | Snyder | July 15, 1952 |
| 2,618,456 | Parish | Nov. 18, 1952 |
| 2,637,434 | Harper | May 5, 1953 |

FOREIGN PATENTS

| Number | Country | Date |
|---|---|---|
| 465,891 | Canada | June 13, 1950 |